United States Patent [19]

Harshavardhana

[11] Patent Number: 5,014,262
[45] Date of Patent: May 7, 1991

[54] APPARATUS AND METHOD FOR DETECTING AND ELIMINATING CALL LOOPING IN A NODE-BY-NODE ROUTING NETWORK

[75] Inventor: Paramasiv Harshavardhana, Freehold, N.J.

[73] Assignee: AT&T Bell Laboratories, Murray Hill, N.J.

[21] Appl. No.: 459,924

[22] Filed: Jan. 2, 1990

[51] Int. Cl.$^5$ .............................. H04J 3/14; H04M 7/00
[52] U.S. Cl. .......................................... 370/16; 370/54; 370/94.1; 340/826; 340/827; 379/220; 379/221
[58] Field of Search ..................... 370/16, 16.1, 94.1, 370/94.3, 60, 14, 54; 340/825.03, 826, 827; 379/219, 220, 221, 271, 272, 273, 253, 284

[56] References Cited

U.S. PATENT DOCUMENTS

| | | | |
|---|---|---|---|
| 4,736,363 | 4/1988 | Aubin et al. | 370/94.1 |
| 4,748,658 | 5/1988 | Gopal et al. | 379/221 |
| 4,773,069 | 9/1988 | Boulton et al. | 370/16 |
| 4,825,206 | 4/1989 | Brice, Jr. et al. | 370/16 |
| 4,873,517 | 10/1989 | Baratz et al. | 340/827 |

Primary Examiner—Douglas W. Olms
Assistant Examiner—Alpus H. Hsu
Attorney, Agent, or Firm—Samuel R. Williamson

[57] ABSTRACT

An apparatus and method for effectively managing a switched virtual circuit network by detecting and resolving call routing problems occurring in the routing pattern of the network is provided. Detecting the call routing problems is advantageously achieved by a first process contained in a network management center which has access to all nodes in the network and performs routing table verification for each node whenever there are changes in the routing tables caused by changes in the network, such as an addition of nodes, links and the like. Otherwise, call looping may occur during call set-up as a result of any undiscovered or uncorrected errors in one or more routing tables in the network. Detection of call loops is achieved by the first process through use of a plurality of processing modules that recognizes and excludes in their analysis of the network certain network components that can not be involved in call looping. Identified routing problems are resolved by a second process which provides alternative recommendations as to how best to modify the routing tables in the nodes of the network. A selected one of the alternative recommendations is coupled from the network management center to the nodes in the network for changing the routing tables located at the respective nodes.

22 Claims, 18 Drawing Sheets

FIG.4

Routing Tables

NJ/HOM/DK1

| CA | TG2, TG1 |
|---|---|
| MI | TG1, TG2 |
| IL | TG2, TG1 |
| TERM1 | RG1 |

MI/DET/DK1

| CA | TG4, TG1 |
|---|---|
| NJ | TG1 |
| IL | TG3, TG1 |
| TERM1 | RG1 |

IL/CHIC/DK1

| CA | TG5, TG3 |
|---|---|
| NJ | TG3, TG5 |
| MI | TG3, TG5 |
| HOST1 | RG1 |

CA/LA/DK1

| NJ | TG2, TG4 |
|---|---|
| MI | TG4, TG2 |
| IL | TG5, TG4 |
| HOST1 | RG1 |

FIG.10

|   | 1 | 2 | 3 | 4 |
|---|---|---|---|---|
| 1 | 0 | 1 | 0 | 2 |
| 2 | 0 | 0 | 0 | 0 |
| 3 | 0 | 1 | 0 | 2 |
| 4 | 2 | 1 | 0 | 0 |

KEY:
NJ=1
CA=2
IL=3
MI=4

FIG.11

|   | 1 | 2 | 3 | 4 |
|---|---|---|---|---|
| 1 | 0 | 1 | 0 | 1 |
| 2 | 0 | 0 | 0 | 0 |
| 3 | 0 | 1 | 0 | 1 |
| 4 | 1 | 1 | 0 | 0 |

KEY:
NJ=1
CA=2
IL=3
MI=4

FIG.12

|   | 1 | 2 | 3 | 4 |
|---|---|---|---|---|
| 1 | 0 | 1 | 0 | 1 |
| 2 | 1 | 0 | 1 | 1 |
| 3 | 0 | 1 | 0 | 1 |
| 4 | 1 | 1 | 1 | 0 |

KEY:
NJ=1
CA=2
IL=3
MI=4

|   | 1 | 2 | 3 | 4 | 5 | 6 | 7 | 8 | 9 |
|---|---|---|---|---|---|---|---|---|---|
| 1 | 0 | 0 | 0 | 0 | 0 | 0 | 0 | 0 | 0 |
| 2 | 1 | 0 | 0 | 0 | 0 | 2 | 0 | 0 | 0 |
| 3 | 0 | 1 | 0 | 2 | 3 | 0 | 0 | 0 | 0 |
| 4 | 1 | 0 | 2 | 0 | 0 | 0 | 0 | 0 | 0 |
| 5 | 0 | 1 | 2 | 0 | 0 | 0 | 0 | 0 | 0 |
| 6 | 1 | 0 | 0 | 0 | 0 | 0 | 2 | 0 | 0 |
| 7 | 1 | 0 | 0 | 0 | 0 | 0 | 0 | 2 | 0 |
| 8 | 1 | 0 | 0 | 0 | 0 | 0 | 0 | 0 | 2 |
| 9 | 0 | 0 | 0 | 0 | 0 | 0 | 1 | 2 | 0 |

FIG.16

|   | 1 | 2 | 3 | 4 | 5 | 6 | 7 | 8 | 9 | r(i) |
|---|---|---|---|---|---|---|---|---|---|------|
| 1 | 0 | 0 | 0 | 0 | 0 | 0 | 0 | 0 | 0 | 0 |
| 2 | 1 | 0 | 0 | 0 | 0 | 1 | 0 | 0 | 0 | 2 |
| 3 | 0 | 1 | 0 | 1 | 1 | 0 | 0 | 0 | 0 | 3 |
| 4 | 1 | 0 | 1 | 0 | 0 | 0 | 0 | 0 | 0 | 2 |
| 5 | 0 | 1 | 1 | 0 | 0 | 0 | 0 | 0 | 0 | 2 |
| 6 | 1 | 0 | 0 | 0 | 0 | 0 | 1 | 0 | 0 | 2 |
| 7 | 1 | 0 | 0 | 0 | 0 | 0 | 0 | 1 | 0 | 2 |
| 8 | 1 | 0 | 0 | 0 | 0 | 0 | 0 | 0 | 1 | 2 |
| 9 | 0 | 0 | 0 | 0 | 0 | 0 | 1 | 1 | 0 | 2 |
| c(i) | 5 | 2 | 2 | 1 | 1 | 1 | 2 | 2 | 1 | |

FIG.17

|   | 2 | 3 | 4 | 5 | 6 | 7 | 8 | 9 | r(I) |
|---|---|---|---|---|---|---|---|---|------|
| 2 | 0 | 0 | 0 | 0 | 1 | 0 | 0 | 0 | 1 |
| 3 | 1 | 0 | 1 | 1 | 0 | 0 | 0 | 0 | 3 |
| 4 | 0 | 1 | 0 | 0 | 0 | 0 | 0 | 0 | 1 |
| 5 | 1 | 1 | 0 | 0 | 0 | 0 | 0 | 0 | 2 |
| 6 | 0 | 0 | 0 | 0 | 0 | 1 | 0 | 0 | 1 |
| 7 | 0 | 0 | 0 | 0 | 0 | 0 | 1 | 0 | 1 |
| 8 | 0 | 0 | 0 | 0 | 0 | 0 | 0 | 1 | 1 |
| 9 | 0 | 0 | 0 | 0 | 0 | 1 | 1 | 0 | 2 |
| c(I) | 2 | 2 | 1 | 1 | 1 | 2 | 2 | 1 | |

FIG.18

|   | 2 | 3 | 5 | 6 | 7 | 8 | 9 | r(I) |
|---|---|---|---|---|---|---|---|------|
| 2 | 0 | 0 | 0 | 1 | 0 | 0 | 0 | 1 |
| 3 | 1 | 0 | 1 | 0 | 0 | 0 | 0 | 2 |
| 5 | 1 | 1 | 0 | 0 | 0 | 0 | 0 | 2 |
| 6 | 0 | 0 | 0 | 0 | 1 | 0 | 0 | 1 |
| 7 | 0 | 0 | 0 | 0 | 0 | 1 | 0 | 1 |
| 8 | 0 | 0 | 0 | 0 | 0 | 0 | 1 | 1 |
| 9 | 0 | 0 | 0 | 0 | 1 | 1 | 0 | 2 |
| c(I) | 2 | 1 | 1 | 1 | 2 | 2 | 1 | |

FIG.22

$$\begin{array}{c} \phantom{0}\phantom{0}7\phantom{0}8\phantom{0}9 \\ \begin{array}{c}7\\8\\9\end{array}\left[\begin{array}{ccc}0 & 2 & 0 \\ 0 & 0 & 2 \\ 1 & 2 & 0\end{array}\right]\end{array}$$

FIG.23

|   | 1 | 2 | 3 | 4 | 5 | 6 | 7 | 8 | 9 |
|---|---|---|---|---|---|---|---|---|---|
| 1 | 0 | 0 | 0 | 0 | 0 | 0 | 0 | 0 | 0 |
| 2 | 1 | 0 | 0 | 0 | 0 | 2 | 0 | 0 | 0 |
| 3 | 0 | 1 | 0 | 2 | 3 | 0 | 0 | 0 | 0 |
| 4 | 1 | 0 | 2 | 0 | 0 | 0 | 0 | 0 | 0 |
| 5 | 0 | 1 | 2 | 0 | 0 | 0 | 0 | 0 | 0 |
| 6 | 1 | 0 | 0 | 0 | 0 | 0 | 2 | 0 | 0 |
| 7 | 1 | 0 | 0 | 0 | 0 | 0 | 0 | 2 | 0 |
| 8 | 1 | 0 | 0 | 0 | 0 | 0 | 2 | 0 | 0 |
| 9 | 0 | 0 | 0 | 0 | 0 | 0 | 1 | 2 | 0 |

APPARATUS AND METHOD FOR DETECTING AND ELIMINATING CALL LOOPING IN A NODE-BY-NODE ROUTING NETWORK

BACKGROUND OF THE INVENTION

1. Technical Field

This invention relates to data networks employing node-by-node routing and more particularly, to an improved apparatus and method for identifying and eliminating call looping in such data networks.

2. Description of the Prior Art

In many current data communication arrangements, data is coupled between a network's end-points (such as terminals, personal computers configured as terminals and mainframe computers) via virtual circuits. These virtual circuits are established in response to a destination address contained in the dialing information entered by a user. One such data communication arrangement is the Customer Network Offering (CNO) II, a virtual circuit packet data network based on the DATAKIT® virtual circuit switch system. This system provides a three-level address that is analogous to a public telephone address and includes an area code, an exchange and a service-name therein. Each level of the address is stored in a routing table in each circuit switch node. The routing table maps an address-level to a trunk-group or a receiving-group that leads to the destination end-point.

Before a call can be established and data transmitted, a virtual circuit must first be set up between the source and the destination in the network. The path taken by the virtual circuit is determined by the routing tables stored in the circuit switch nodes. Once the virtual circuit is set up, all packets of data between the source and destination are transmitted over the path established by the virtual circuit.

In traffic engineering of in-service data networks, network wide measurements are periodically taken to detect service problems. One of the most frequently occurring service problem for data calls is the under utilization of some network components and the over utilization of others. An effective solution to this problem is to divert traffic from the over utilized network components to the under utilized network components. This has the effect of distributing the traffic load more uniformly across the network. In order to effect such rerouting, however, it is necessary to change the routing pattern, i.e., to make changes to the existing routing tables in the circuit switch nodes.

In node-by-node routing networks, making such changes is nontrivial and may introduce errors in the routing tables. Uncorrected errors in the routing tables can cause a number of problems for the network which adversely affect network performance. One such problem is call looping which causes a call to cycle around the same set of nodes during call set-up. A call involved in a loop may eventually break out of the loop and reach its destination, or it may tie up all the virtual circuits available and may have to be retried. In either case, call looping leads to serious network inefficiencies and should be avoided. Another problem is circuitous routing which results in calls being established over paths involving too many hops, i.e., a call passing through too many circuit switch nodes, violating the design constraints. Circuitous routing also leads to network inefficiencies in the form of unacceptably large network delays. Yet another problem resulting from errors in a routing table is dead-end routing which causes some destinations in the network to be unreachable.

SUMMARY OF THE INVENTION

In accordance with the invention, there is provided an apparatus and method for effectively managing a switched virtual circuit network by detecting and resolving routing problems ocurring in the routing pattern of the network. Detecting the routing problems is advantageously achieved in preferred embodiments by a first process or program contained in a network management center which has access to all of the nodes in the network and performs routing table verification for each node. Such routing table verification is necessary whenever there are changes in the routing tables caused by changes in the network (such as addition of nodes, links, etc.). This verification assures that the routing tables in the various circuit switch nodes in the network are in accordance with normal acceptable design constraints. In accordance with the invention, identified routing problems are resolved, in preferred embodiments, by a second process or program which provides alternative recommendations as to how best to modify the routing tables in the nodes of the network. A selected one of the alternative recommendations is coupled from the network management center to the nodes in the network for changing the routing tables located at the respective nodes.

One routing problem that is detected and resolved, in accordance with the invention, is call looping which may occur during call set-up as a result of undiscovered or uncorrected errors in one or more routing tables in the network. Detection of call loops is achieved by the first process through use of a plurality of processing modules that recognizes and excludes in their analysis of the network certain network components that can not be involved in call looping. Once those network nodes involved in call looping are identified, the first process next determines the number of loops and the direction of travel between nodes for each loop.

Call loops are eliminated by the second process, in accordance with the invention, through use of a plurality of processing modules that use the data generated in the first process along with data about the network routing pattern available in the network database. These modules determine the routes that are involved in the most number of loops. They also examine many different ways of breaking these loops in the given routing pattern and provide the series of alternative recommendations for eliminating the loops.

Another routing problem that is detected and resolved is circuitous routing which adversely affects network performance. The length of primary paths from the node nearest the origin of a call to the destination node via all the nodes that are not directly connected to the destination node are checked. If any path exceeds a predetermined hop-constraint, that path is identified as a circuitous route and a reviewer evaluates the routing choices for the network and selects a more direct path that does not violate the hop-constraint.

Yet another routing problem that is detected and resolved is dead-end routing. To route a call a node must know all the area codes in the network, all the exchanges in its own area, and all the service-names in its own exchange. If any part of this information is not present in the routing tables of one or more nodes, then dead-end routes will result. In checking for dead-end routes, the information in each of the routing tables is compared with the detailed network configuration information available from the network database in order to insure that the data needed to route calls to all the desired destinations is present in all the routing tables. If any information is missing, it is detected and added to the appropriate routing tables.

BRIEF DESCRIPTION OF THE DRAWING

This invention and its mode of operation will be more clearly understood from the following detailed description when read with the appended drawing in which:

FIG. 4 shows routing tables for each of the nodes of the network shown in FIG. 3;

FIG. 10 shows a routing array which corresponds to the routing pattern for calls to the first one of the hosts in the data network shown in FIG. 5;

FIG. 11 shows an adjacency matrix for calls to the first one of the hosts in the data network shown in FIG. 5;

FIG. 12 shows a network connectivity matrix for the data network shown in FIG. 3;

FIG. 16 shows an adjacency matrix for the routing pattern shown in FIG. 14 in accordance with the invention;

FIG. 17 shows a first modified adjacency matrix for the routing pattern shown in FIG. 14 in accordance with the invention;

FIG. 18 shows a second modified adjacency matrix for the routing pattern shown in FIG. 14 in accordance with the invention;

FIG. 22 shows a routing submatrix for a portion of the routing matrix shown in FIG. 15 in accordance with the invention; and FIG. 23 shows a routing matrix adjusted in accordance with the processes outlined in FIGS. 13 and 21 in accordance with the invention.

DETAILED DESCRIPTION

Figure 1:
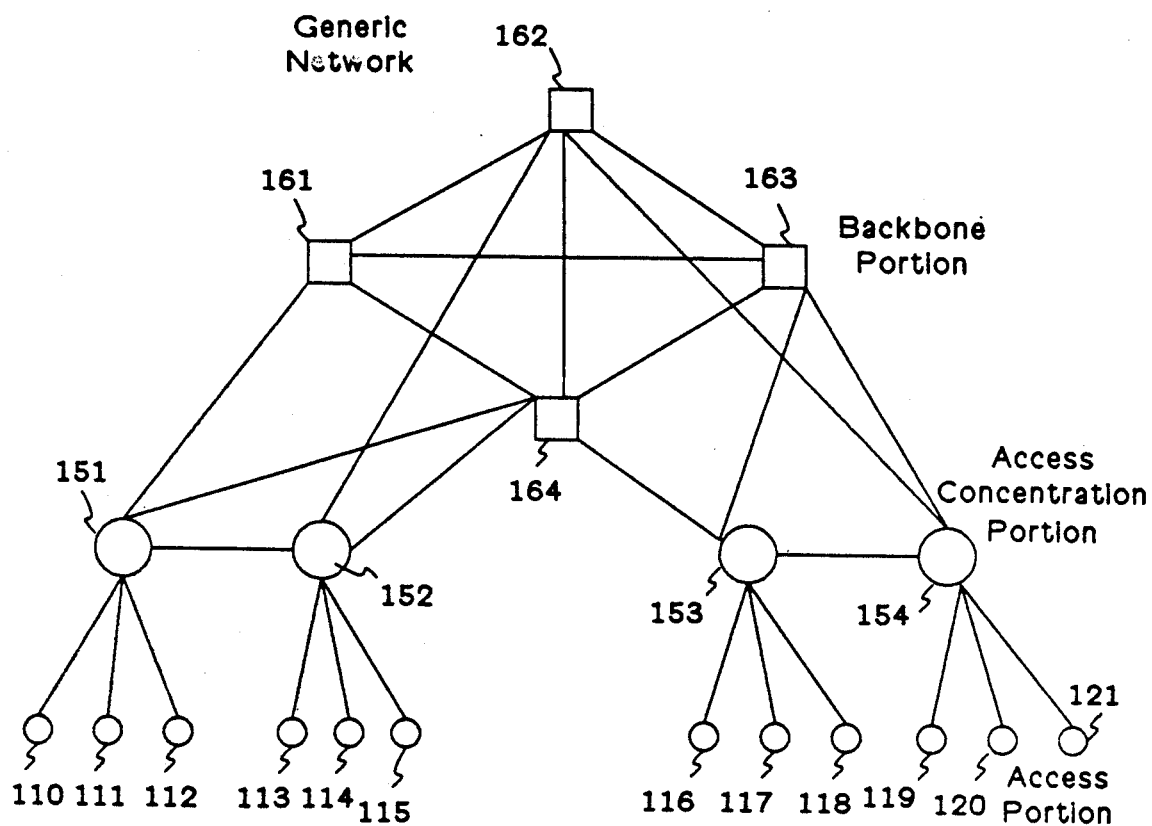
FIG. 1 is a simplified illustration of a generic data network having a backbone portion, an access concentration portion and an access portion.

Referring now to FIG. 1, there is shown a switched virtual circuit generic network which is comprised of an access portion, an access concentration portion and a backbone portion. End users are attached to nodes 110 through 121 in the access portion in order to communicate with other nodes in the network. The access concentration portion, comprising nodes 151 through 154, serves to concentrate traffic from the nodes in the access portion and is usually found in large data networks. The backbone portion comprising nodes 161 through 164 provides interconnection between the various nodes in the access concentration portion, or, in smaller networks, directly between the nodes in the access portion.

Certain portions of the generic network are highly susceptible to call looping whenever routing changes are made in the network. The access portion of the network typically is hierarchical with several nodes homing to a single hub node. The nodes in the access portion are not often involved in call loops because this hierarchical routing does not cause loops and also because there is usually is not enough connectivity, i.e., nodes in the same portion connected to each other, between the access nodes to cause call looping. On the other hand, the backbone portion of the network is nonhierarchical and usually has much higher connectivity than in the access portion. The higher connectivity is provided to increase network·reliability by means of alternate routing. And the access concentration portion of the network typically has a mixture of hierarchical and non-hierarchical routing, more connectivity than the access portion and may also have alternate routing. Thus the nodes in both the backbone portion and the access concentration portion are vulnerable to call looping. When there are changes to the routing pattern in the network, therefore, all nodes in the backbone portion must be checked for call looping. Nodes in the access concentration portion, if present, must also be checked for call looping. The access nodes may optionally not be checked for call looping unless a service problem is reported or suspected therein.

In order for call looping to occur in the network, at least three nodes must be involved in the loop. Looping can not occur between just two nodes since each node in a virtual circuit switch is configured so that a call is prevented from going back out over the same trunk-group that it came on into the node. If there are multiple parallel trunk-groups between a pair of nodes, call looping can easily occur between these nodes if errors are inadvertently introduced in their routing tables.

Figure 2:
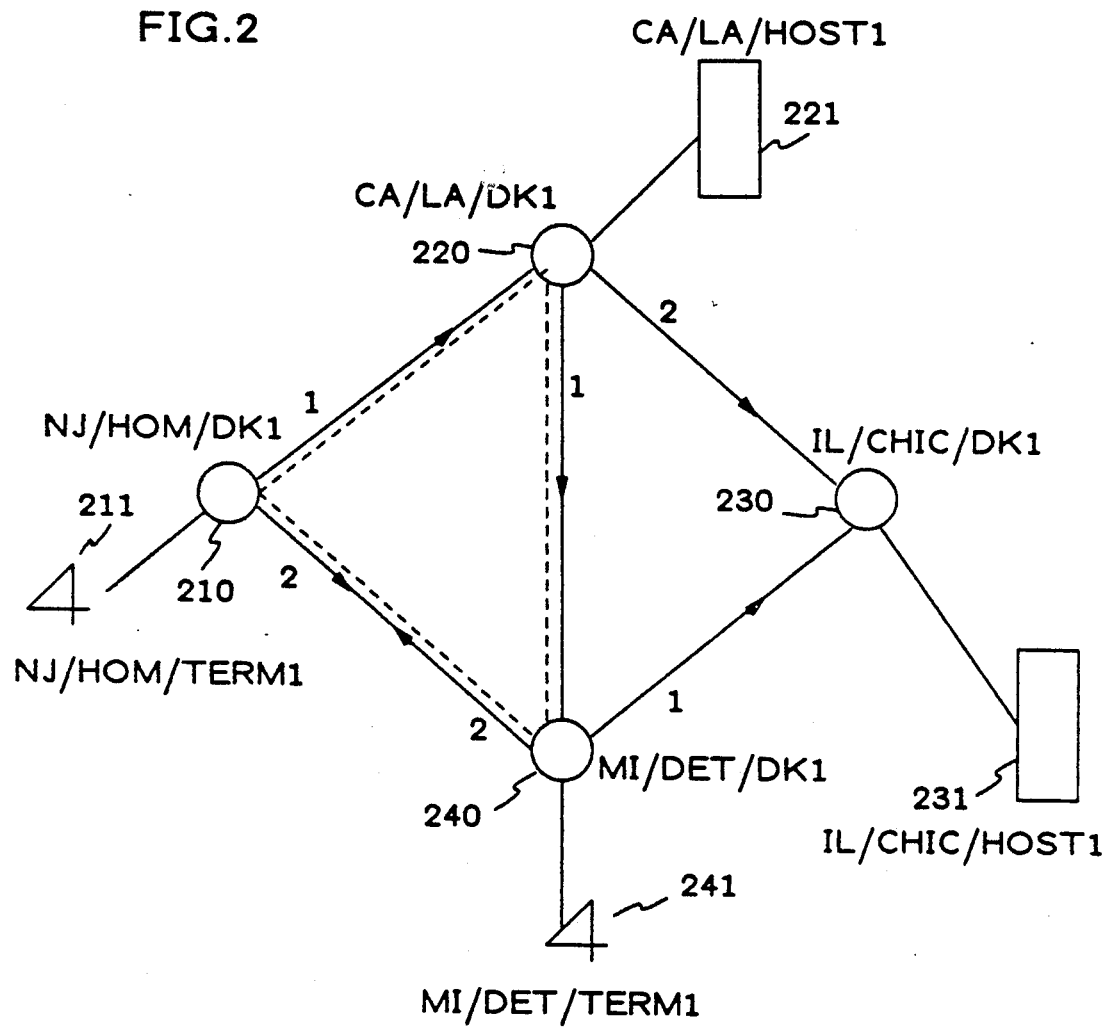
FIG. 2 shows a simplified data network having four nodes along with terminals and hosts connected to the nodes.

Referring next to FIG. 2, there is shown a simplified network consisting of four network nodes 210, 220, 230 and 240 linked together and respectively located in, by way of example, New Jersey or NJ/HOM/DK1 (NJ), California or CA/LA/DK1 (CA), Illinois or IL/CHIC/DK1 (IL) and Michigan or MI/DET/DK1 (MI). Also, as shown, associated terminals NJ/HOM/TERM1 (terminal 211) and MI/DET/TERM1 (terminal 241), and hosts CA/LA/HOST1 (host 221) and IL/CHIC/HOST1 (host 231) are connected to dedicated ones of these network nodes. The referenced designations illustrated in FIG. 2 along side the network nodes, the associated terminals and hosts represent the respective addresses of these units.

Referring to FIG. 2 in greater detail, there is shown routing choices for calls to the host 231 attached to the node 230 in IL. Arrows on the circuit connections or links connecting the nodes indicate the direction in which calls to host 231 are routed from the other network nodes. A "1" next to a link indicates that the link is used as a first choice route. A "2" next to a link indicates that the link is used as a second choice route.

Also shown in FIG. 2 is an example of how call looping may be caused by an error in a routing table. How a call enters this loop is illustrated thusly. If the primary route from node 240 to node 230 is not available for a call intended for host 231, then calls to this host are routed over the secondary route to node 210 and thus enter a loop formed between nodes 210 in NJ, 220 in CA and 240 in MI. The call loop is depicted by the dashed lines between these nodes. The looping problem in this relatively simple example is resolved, however, if the primary and secondary routes from CA are interchanged such that the primary route is established between nodes 220 and 230 and the secondary route is established between nodes 220 and 240. The single-link loop between the nodes 210 and 240 does not cause call looping because, as indicated earlier herein, a node in the network does not allow a call that comes in on a trunk-group to go back out on that same trunk-group.

Circuitous routing is illustrated in FIG. 2 by the primary routes used in setting up communications to the host 231 from the node 210 in NJ. The primary route from node 210 in NJ passes through the node 220 in CA, node 240 in MI and node 230 in IL. This example of circuitous routing is caused by an error in the routing table at node 220 in CA. It is easily resolved by changing the routing table in node 220 such that the direct link to node 230 in IL is selected as the primary route instead of choosing the tandem path via the MI node 240 as the primary route.

A dead-end route is illustrated in FIG. 2 by the absence of an arrow on the link connecting node 230 at IL to the host 231. In this example, once a call to the host 231 reaches the node 230, the call cannot be forwarded to its destination since the node 230 contains no entry in its routing table to indicate that the host 231 is a local service name. It is thus apparent that isolated errors in the routing tables of individual nodes have a network wide impact.

Figure 3:
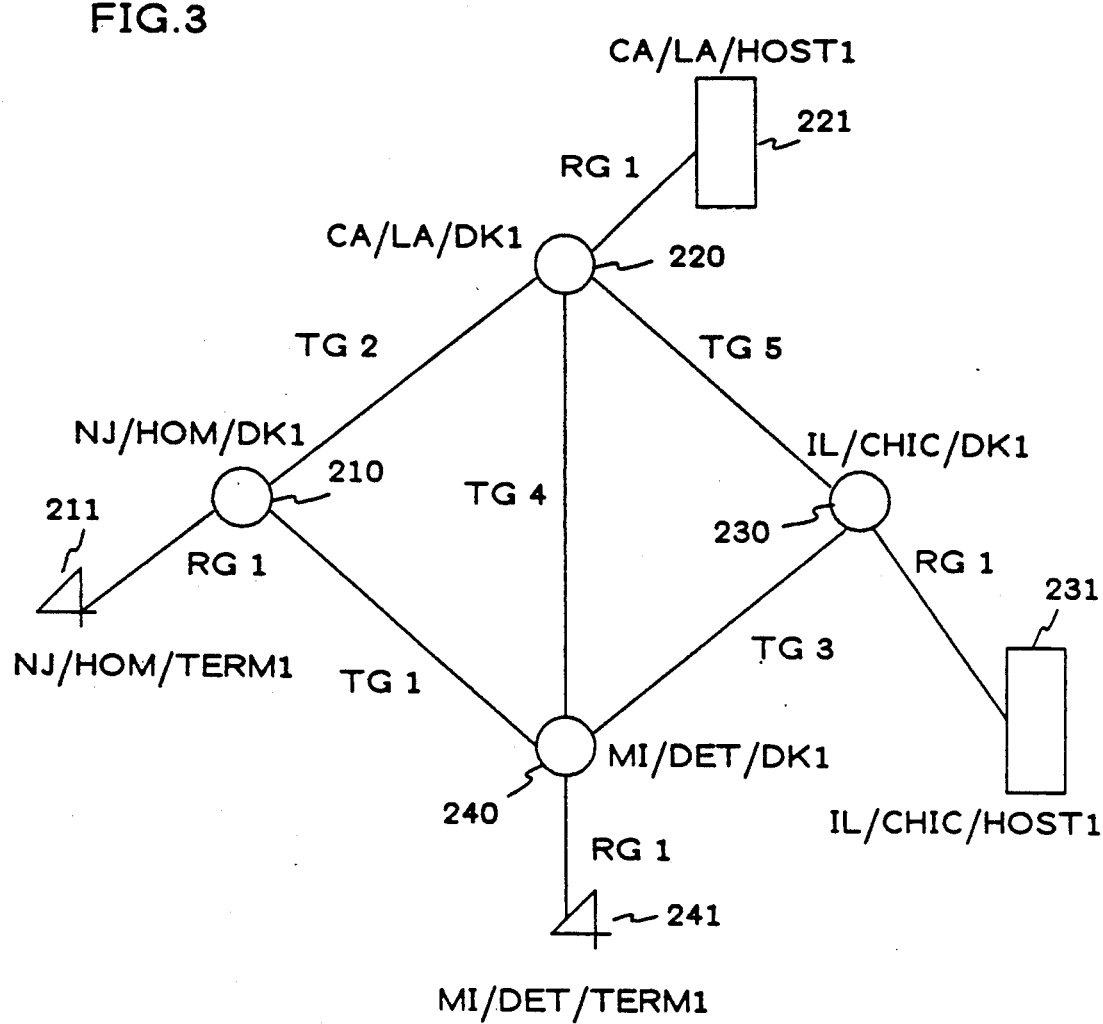
FIG. 3 shows the data network of FIG. 2 including trunk-groups and receiving groups.

With reference next to FIGS. 3 and 4, the four node network depicted in FIG. 2, is shown in FIG. 3 and further includes the names of trunk-groups and receiving-groups interconnecting the network nodes, terminals and hosts. A routing table for each of the four network nodes is shown in FIG. 4. Each routing table maps an address-level to a trunk-group or receiving-group that leads to a destination end-point. By way of explanation, if the routing table for the node 210 in NJ is examined, it is seen that each area address, CA, MI and IL, in the routing table is associated with a pair of trunk-groups. The first trunk-group in the pair is the primary group. The group TG2, for example, is the primary trunk-group for calls from the node 210 in NJ to the node 220 in CA. The second trunk-group (and subsequent groups when included) is used for alternate routing which occurs when the elements of the primary trunk-group are busy, or have failed. In this example, the group TG1 is the single alternate trunk-group for calls from the node 210 for node 220 in CA. The receiving-group RG1 routes calls from the node 210 in NJ to the terminal 211.

Call routing is performed in accordance with the destination address contained in the dialing information entered by a user. When a call is originated at a terminal, for example, the destination address which includes an area code, an exchange and a service name is examined at an access node. The area code is examined first and if there is no match with the local area code, the routing table is examined to search for an available trunk-group corresponding to the destination area code so that the call may be sent outward to another network node towards the destination. If during the examination, the destination area code is found to match the local area code, however, then the destination exchange is examined. If the destination exchange is found to match the local exchange, then the service-name is examined to locate a receiving-group for establishing the call over. If the destination exchange does not match the local exchange, then the routing table is again examined to find an available trunk-group corresponding to the destination exchange for sending the call outward to another node towards the destination exchange. As the call proceeds from node to node, this process is repeated at each node until the destination node is reached.

Since the switched virtual circuit network routes calls based on the destination address, call looping is also a destination dependent phenomenon. If the network is loop-free, then no calls to any destination can loop. If the network has loops, however, then calls to some destinations may loop, while calls to other destinations may not. This destination dependent phenomenon is illustrated in the simplified network commonly shown in both FIGS. 5 and 6, which are next referred to in combination.

Figure 5:
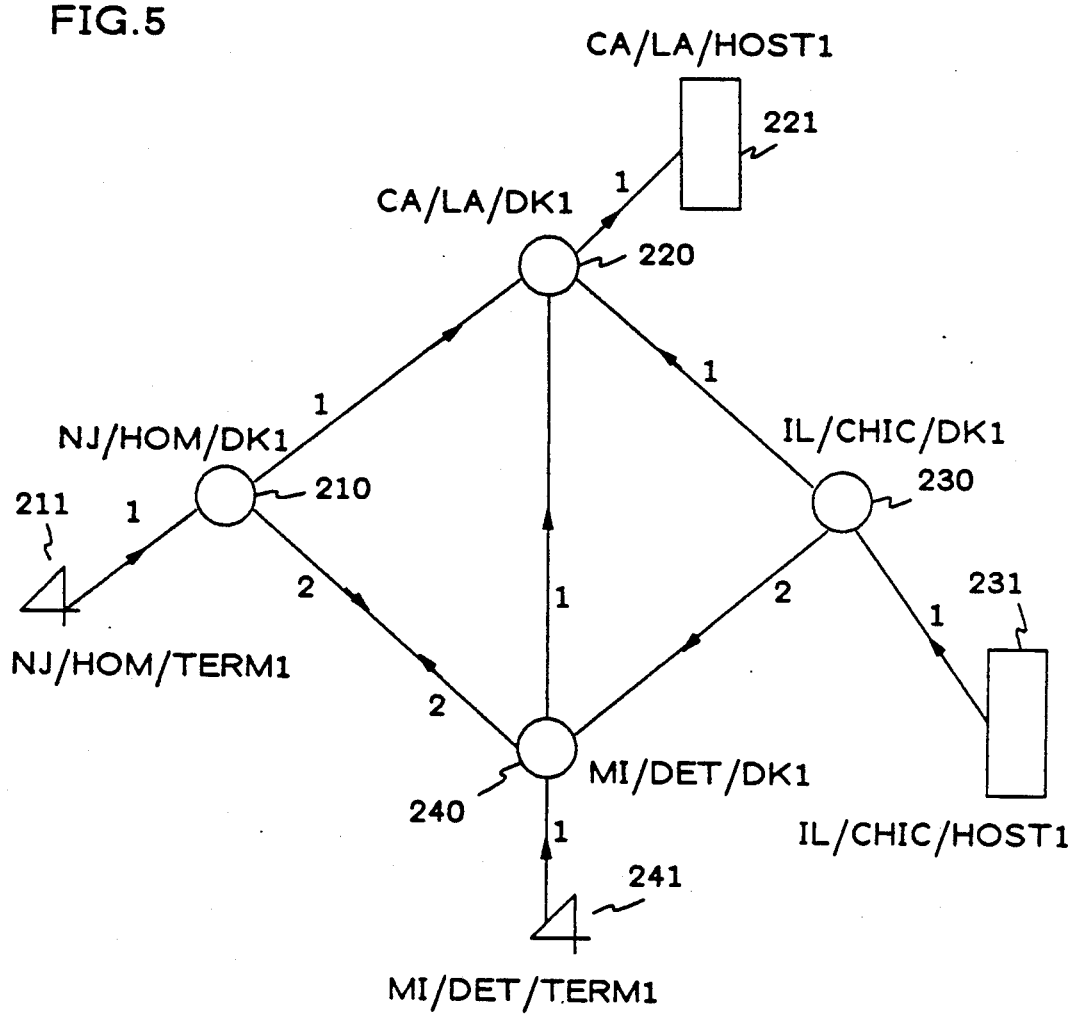
FIG. 5 shows a routing pattern for calls to a first one of the hosts in the data network shown in FIG. 3.
Figure 6:
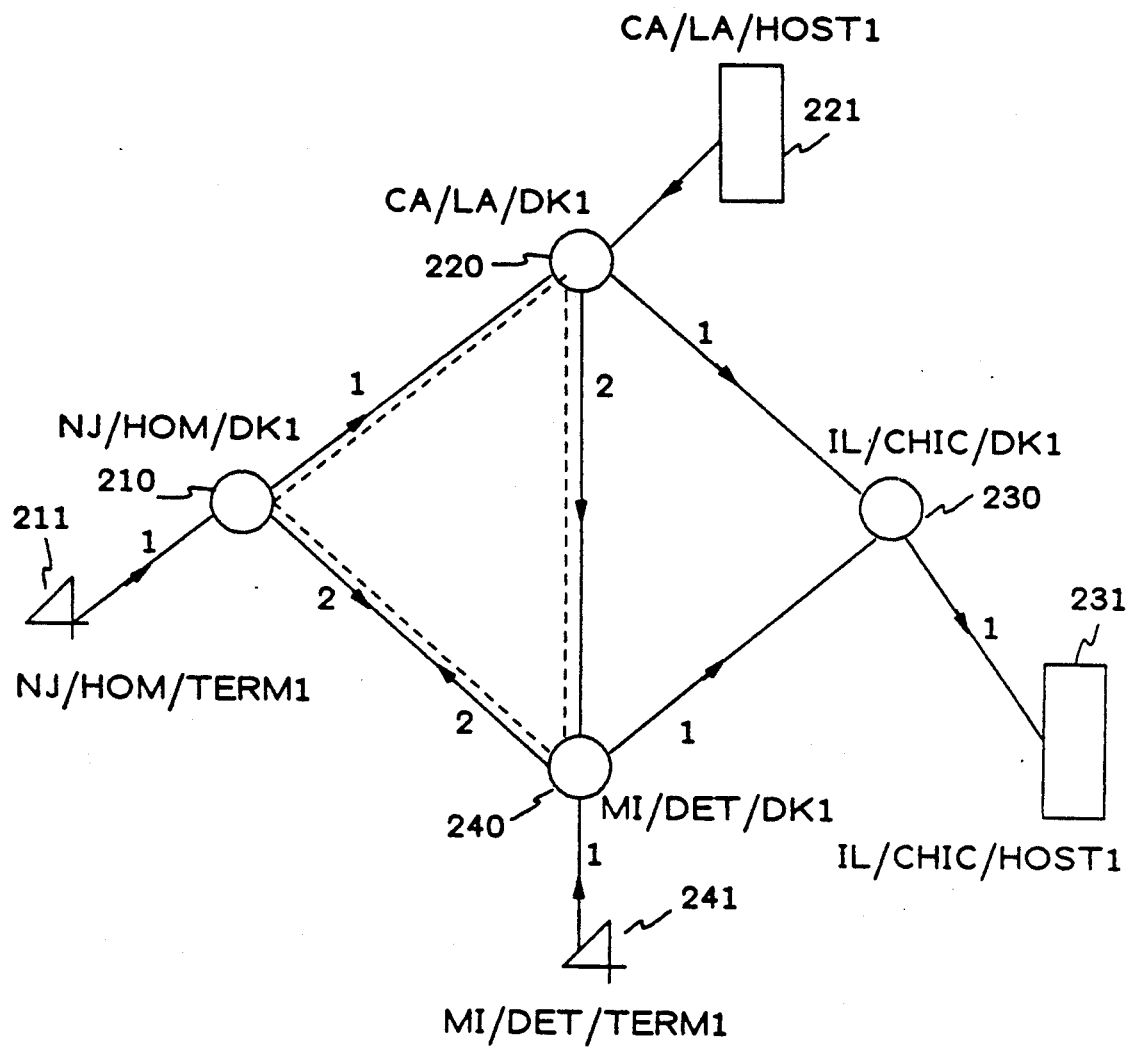
FIG. 6 shows a routing pattern for calls to a second one of the hosts in the data network shown in FIG. 3.

FIG. 5 shows the simplified network consisting of the four network nodes 210, 220, 230 and 240 with a routing pattern corresponding to the routing table shown in FIG. 4 for calls to the host 221. FIG. 6 shows the same network. Its routing pattern, however, corresponds to the routing table for calls to the host 231. In both FIGS. 5 and 6, "1" indicates a first choice primary route and "2" indicates a second choice or alternate route. In FIG. 5 it is seen that there is no loop in the routing pattern for calls to the host 221. In FIG. 6, however, it is seen that the routing pattern for calls to the host 231 contains a loop. This loop involves the nodes 210, 220 and 240 respectively located at NJ, CA and MI and is entered if the primary routes to IL from CA and MI are both unavailable. Thus, in the same network it is possible for calls to some destinations to loop, while calls to other destinations will not loop. Since each destination has a unique routing pattern associated with it, each routing pattern has to be examined individually to check for loops.

Figure 7:
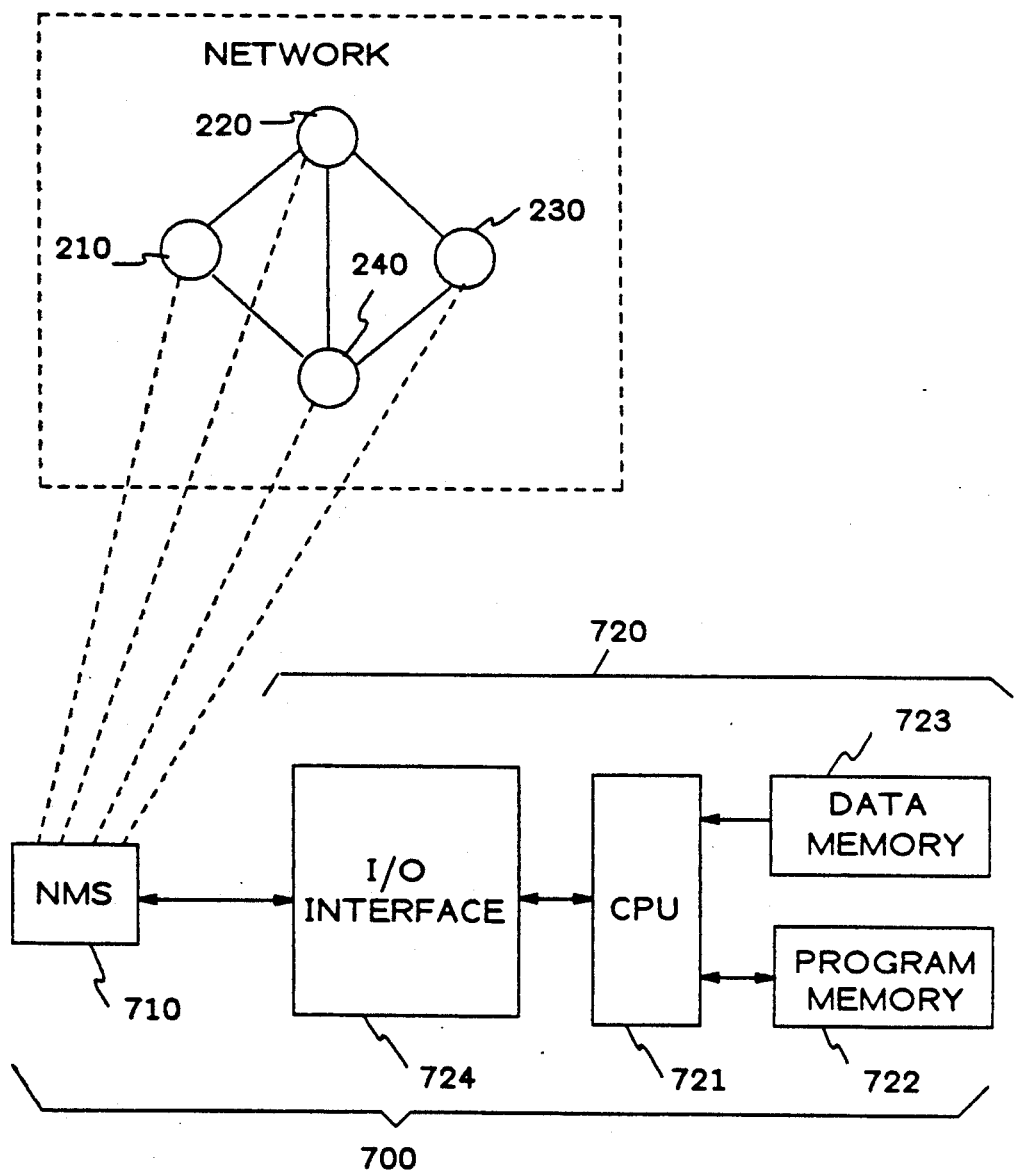
FIG. 7 shows the data network of FIG. 3 and a network management center including the present invention.

With reference next to FIG. 7, there is shown the simplified node-by-node routing switched virtual circuit network of FIG. 3 and a diagram of a network management center 700 which incorporates the present invention. Contained in the network management center 700 are a network management system (NMS) 710 and a network control system (NCS) 720 which includes processing circuitry having, in accordance with the invention, a loop detection and elimination module, a circuitous routing detection module and a dead-end route detection module. The network management system 710 which has access to all the nodes in the network maintains the network and collects various types of data including routing information. The routing information is coupled into the network control system 720 which analyzes the routing information, finds trouble spots if there are any and determines how best to resolve the problems. Routing changes determined by the network control system 720 are coupled to the network management system 710 which then changes the routing tables located at the nodes.

The processing circuitry in the network control system 720 includes a central processor unit (CPU) 721 for processing the indicated modules and for controlling other features and functions of the system. Program memory 722 provides instructions to the central processor unit 721. Data memory 723 is utilized by the CPU 721 for storing and accessing data associated with processing the modules and for performing the features and functions programmed in program memory 722. In the illustrated embodiment CPU 721 is a processor, program memory 722 is read-only-memory (ROM) and data memory 723 is a combination of both random access memory (RAM) and electrical erasable programmable read-only memory (EEPROM). The input/output interface circuit 724 contains the switching, network control, and line circuits required by the network control system 720 to establish, maintain and terminate communications with the network management system 710.

A single virtual circuit switch node may be connected to up to a thousand terminals, hosts and other switch nodes. Even in a small network cosisting of 10 nodes, there can be as many as 10,000 different destination end-points, each of which gives rise to a different routing pattern. Even though the illustrative example provided herein considers only a small number of switch nodes and the routing patterns contained therein, the process described later herein is applicable to and provides the means for checking a much larger number of routing patterns. The process is also flexible, however, in that it can be restricted so that only the routing patterns that are most likely to cause call looping are examined. Some errors may be missed by this restriction, however.

Figure 8:
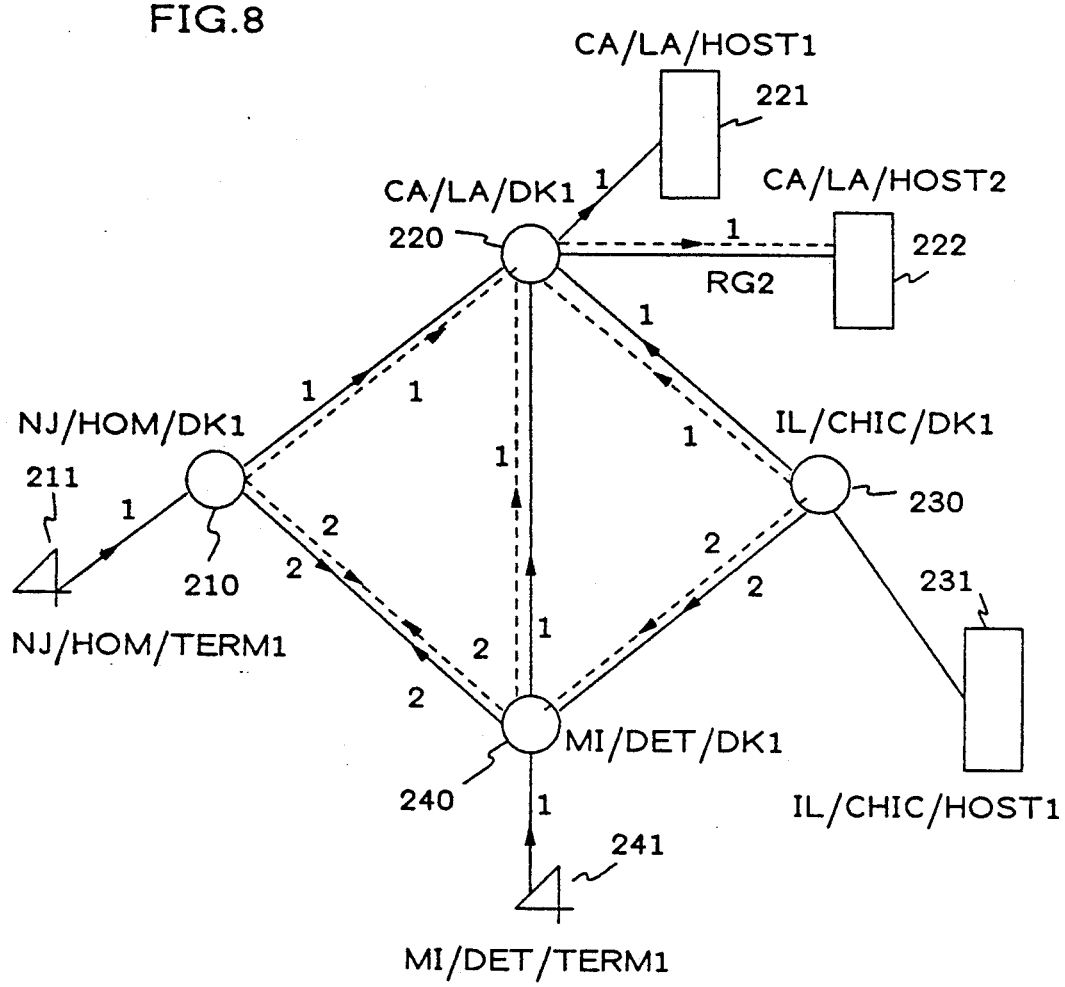
FIG. 8 shows routing patterns for calls to the first one of the hosts and to a third one of the hosts in the data network shown in FIG. 3.

How these errors may be missed are shown, by way of example, in FIG. 8 which shows the network in FIG. 3 and the routing pattern for calls to the host 221. FIG. 8 has also been modified to include a second host, CA/LA/HOST2 (host 222), connected to the node 220 in CA through receiving-group RG2. The routing tables of all the nodes remain the same as in FIG. 4, except that an entry is added to the routing table of the node 220 to indicate that RG2 is the receiving group for the end-point, host 222. The routing pattern for calls to the host 221 is shown in solid lines and the routing pattern for calls to host 222 is shown in dashed lines. The only difference between the two routing patterns is that calls for each host leave the node 220 via a specific receiving-group. If the end-points, host 221 and host 222, are included in the routing patterns, however, the resulting routing patterns are different. If this difference is ignored, and the two routing patterns treated as being identical, then it is possible that some loops may go undetected. Suppose there is an error in the routing table at node 220, for example, such that the entry "HOST2 RG2" is replaced by "HOST2 TG4" where TG4 is the trunk-group connecting the node 220 at CA to the node 240 at MI. The routing pattern for host 221 is unaffected, but the routing pattern for host 222 changes to the one shown in FIG. 9.

Figure 9:
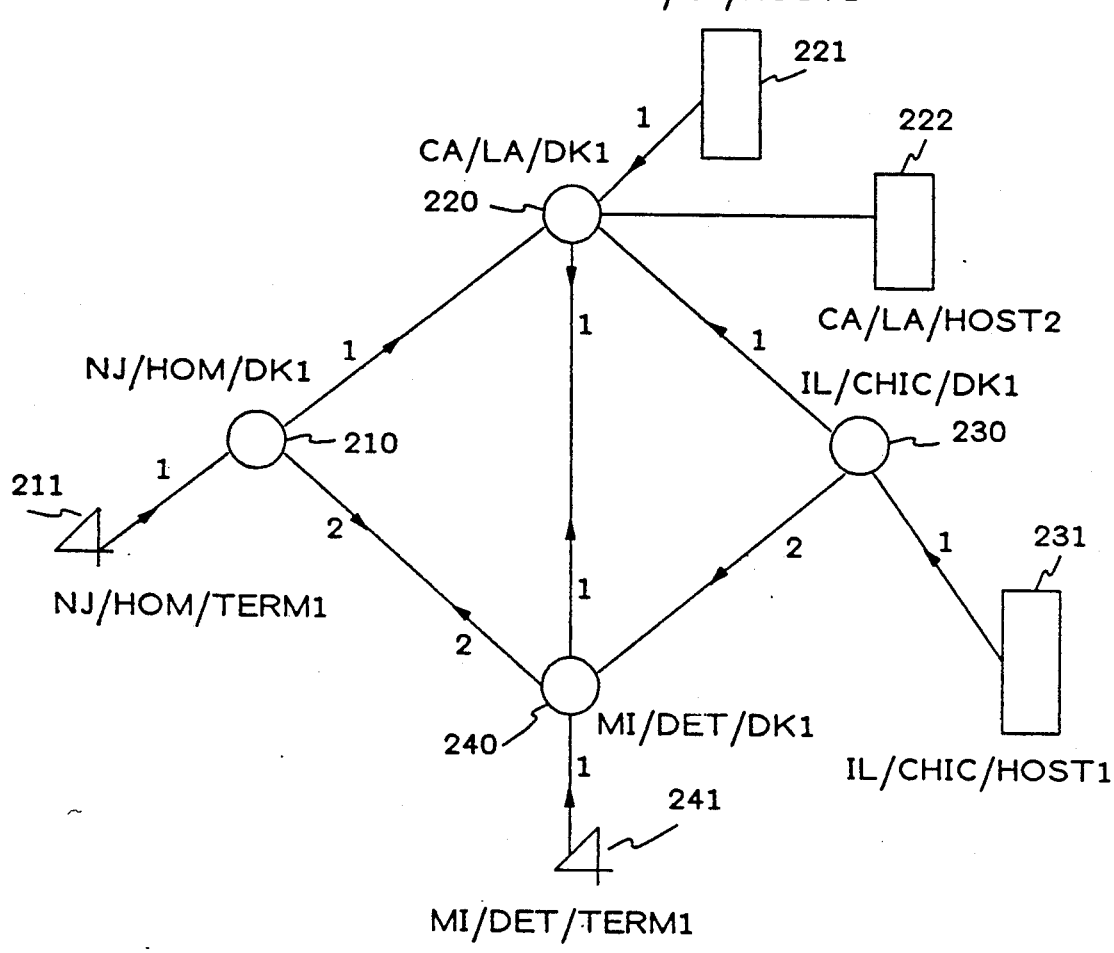
FIG. 9 shows another routing pattern for calls to the third one of the hosts in the data network shown in FIG. 3.

With reference to FIG. 9, the routing pattern for host 222 shown therein has a call loop which involves node 210 in NJ, node 220 in CA and node 240 in MI. It is seen that a single error in the routing table at node 220 causes call looping for calls to host 222 but does not affect calls to host 221. This call loop is not detected if host 221 and host 222 are excluded from their respective routing patterns. In actual application of the loop detecting process, however, certain situations may dictate that the entire network not be checked such as when the network is large. In such a case, a decision may be made to exclude the access portion with a view toward saving time and/or expense. If such a decision is made, there is a risk of not detecting call loops which involve either the access nodes or the end-points. If a service problem is reported or suspected in the access nodes or the end-points, however, the errors that cause this type of loop problem may advantageously be determined by the process described later herein by including the end-points in the routing patterns selected for evaluation.

With reference to FIG. 10, there is shown in accordance with the invention a routing array corresponding to the routing pattern of FIG. 5 for calls to the host 221. The routing pattern corresponding to a destination is described by identifying the nodes that are to be checked for call looping by assigning each node a number such as 1, 2, 3, etc., this single number representing both the row and column identifier for that node. By way of example, in the network in FIG. 5, there are four nodes which can be identified for ease of understanding by further assigning them the numbers 1 through 4 in a manner that NJ corresponds to 1, CA corresponds to 2, IL corresponds to 3 and MI corresponds to 4. Each routing pattern involving these four nodes thus may be represented by creating an array having four rows and four columns. Data assigned in the array is reflective of a particular relationship that a node has with another node in the routing pattern as illustrated in designated matrices herein.

The array shown in FIG. 10 is designated as the routing matrix "R" with host 221 as the destination. The array is constructed as follows: the entry corresponding to row i and column j is zero either because there is no link connecting nodes i and j or there is a link but it is not used for routing calls from node i to the destination, host 221. If there is a link connecting nodes i and j, and the link is used for routing calls from node i to the destination, host 221, then the corresponding entry in the array reflects the priority of the routing choice. This choice is shown in the array as either 1, 2, 3 or 4 depending on whether the route is a first choice, a second choice, a third choice, or a fourth choice route. In FIG. 10, for example, the entry corresponding to row 1 and column 2 is 1 because calls from NJ to the host 221 are routed as a first choice through CA. The entry in row 1, column 4 is 2 because NJ routes as a second choice calls to the host 221 through MI. The entry in row 1, column 3 is zero because there is no link connecting NJ and IL. And since a node cannot route a call to itself, diagonal entries in the array such as the entries in row 1 column 1, row 2 column 2, etc., are always zero.

From the routing matrix R, another matrix shown in FIG. 11 is derived in accordance with the invention and designated as the adjacency matrix "A" for the destination, host 221. The adjacency matrix is obtained from the routing matrix simply by replacing all entries greater than one, by one. It does not matter what the routing choice is. The only requirement is to identify the links used for routing calls to a given destination.

For loop elimination, the routing and adjacency matrices are employed along with a third matrix derived in accordance with the invention and designated as the network connectivity matrix "X". The network connectivity matrix corresponding to the network in FIG. 3 is shown in FIG. 12. This matrix represents the network connectivity information and is generated for the portion of the network to be evaluated. In this matrix, the entry corresponding to row i and column j is 1 if node i is connected to node j, and zero if it is not. For a given network, there is only one network connectivity matrix which depicts just the connectivity between the nodes in the network. It is not associated with any of the routing patterns.

For purposes of illustrating the loop detecting process, a simplified example which shows the process operating in its restricted mode and addressing a selected portion of a network is described. Before describing how the process works, however, the following terms: sink, source, tandem node and single-link loop node, which are used in the process, are defined. A sink is a node that only has incoming calls and no outgoing calls. A source is a node that only has outgoing calls and no incoming calls. A tandem node is a node that has both incoming and outgoing calls. A single-link loop node is a node that communicates with only one other node; it receives calls from that node and sends calls to that node.

Figure 13:
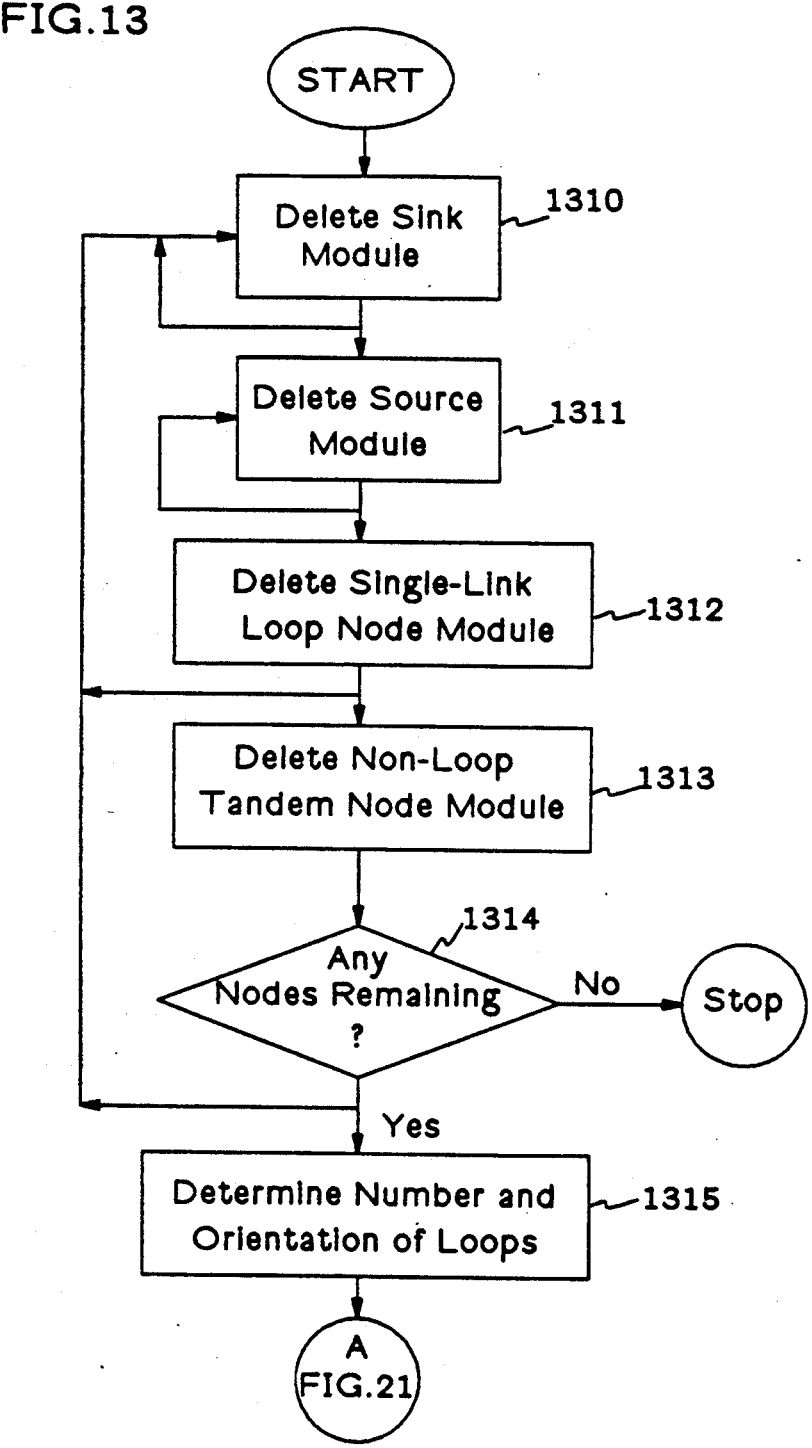
FIG. 13 shows a flow chart outlining a loop detection process in accordance with the invention.

Referring next to FIG. 13, there is shown a flow chart illustrating the operation of the loop detection process in checking routing patterns for call loops. The loop detection process has its basis in the realization that only tandem nodes may be involved in a call loop. No other type of node may be part of a call loop and such other nodes, as defined above, therefore may be deleted by the process. The process has four modules: (i) Delete Sink 1310; (ii) Delete Source 1311; (iii) Delete Single-Link Loop Node 1312 and (iv) Delete Non-Loop Tandem Node 1313. These four modules run cyclically on data representing the routing pattern detecting and deleting the indicated nodes until no further node deletion is possible. Any nodes remaining in the data after these modules have run are involved in one or more loops. If any nodes are still remaining, then a fifth module 1315 determines the number of loops and the orientation (i.e., the direction) of each loop.

Figures 14, 15:
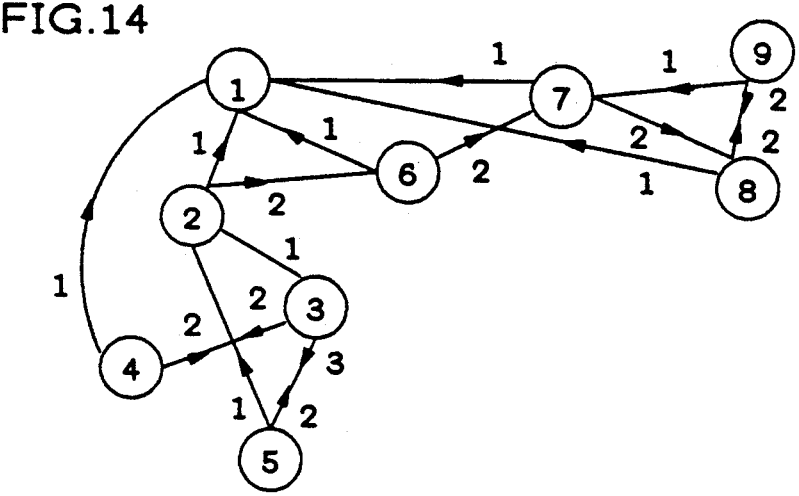
FIG. 14 shows a routing pattern for a destination node in a nine node network.
FIG. 15 shows a routing matrix for the routing pattern shown in FIG. 14 in accordance with the invention.

To illustrate further how the loop detection process works, a routing pattern shown in FIG. 14 is described with reference to the loop detection process of FIG. 13. This routing pattern is for destination node 1 in a 9 node network. Arrows on the circuit connections or links connecting the nodes indicate the direction in which calls to the node 1 are routed from the other network nodes. A "1" next to a link indicates that the link is used as a first choice route. A "2" next to a link indicates that the link is used as a second choice route. A routing matrix R which corresponds to the routing pattern of FIG. 14 is shown in FIG. 15. Each node in this routing pattern is represented by a row and column identifier 1 through 9. A corresponding adjacency matrix A is shown in FIG. 16. This adjacency matrix provides the required data for the loop detection process for identifying the sinks, sources, single-link loop nodes and non-loop tandem nodes for this routing pattern.

Figure 19:
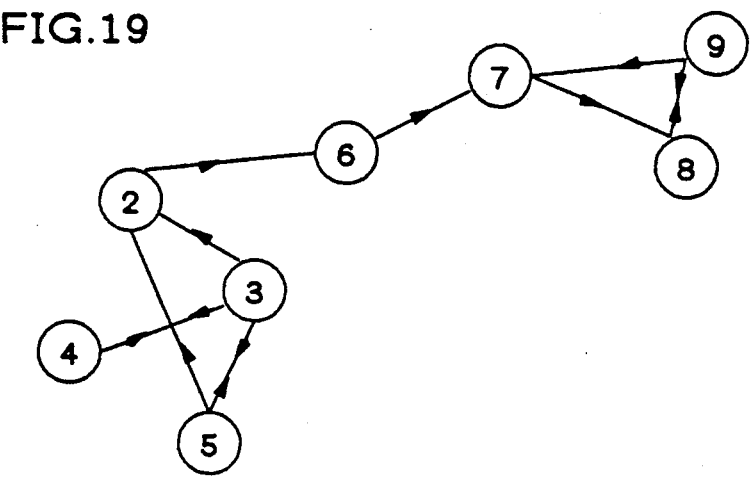
FIG. 19 shows the routing pattern of FIG. 14 after deleting a sink node in accordance with the invention.

The first step in the loop detection process is to obtain the row sum number $r(i)$ and the column sum number $c(i)$ for each row and column of the adjacency matrix. Row sum number $r(i)$ and column sum number $c(i)$ for $i=1$ through 9 are shown with the adjacency matrix in FIG. 16. If $r(i)$ equals zero for some i, then the corresponding node, node i, is a sink. In FIG. 16, $r(1)=0$ and, hence node 1 is a sink. The delete sink module 1310 thus recognizes that node 1 is a sink and deletes node 1 and the links coming into this node. The row sums for the remaining rows are then updated by subtracting entries corresponding to the deleted links. Thus, for example, once node 1 and the links coming into node 1 are deleted, row sum number $r(2)$ changes from 2 to 1 since entry (2,1) in the array in FIG. 16 gets deleted. The modified adjacency matrix is shown in FIG. 17 together with the new row numbers. It should be noted that the column numbers do not change as node 1 had no outgoing links. The routing pattern corresponding to this modified adjacency matrix is shown in FIG. 19.

Figure 20:
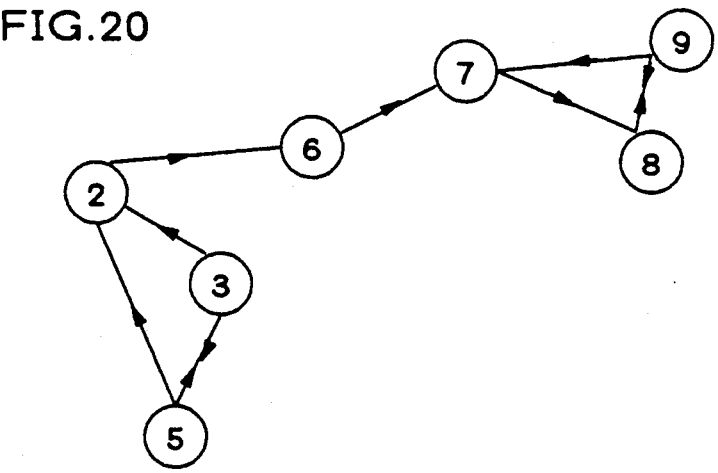
FIG. 20 shows the routing pattern of FIG. 19 after deleting a single-link loop node in accordance with the invention.

Continuing in the process, the delete sink module 1310 searches to see if there is any other row with row numbers equal to zero. Since there is none in this example, the process proceeds to the delete source module 1311. The delete source module 1311 looks at the column number to determine if a node is a source. If $c(i)=0$, then the node i is a source. If such a node exists, the delete source module 1311 deletes that node and all the links leaving the node and recomputes the column numbers. Row numbers do not change since a source node has no incoming links. This process is repeated until no further source nodes remain. In the current example there are no source nodes, so the process proceeds to the delete single-link loop node module 1312. This module recognizes a single-link loop node using the following rule: if $r(i)=c(i)=1$ and $(i,j)=(j,i)=1$ where $(i,j)$ and $(j,i)$ are entries of the modified adjacency matrix, then node i is a single-link loop node. In this example, in FIG. 17, $r(4)=c(4)=1$ and $(4,3)=(3,4)=1$ and, hence node 4 is a single-link loop node. The delete single-link loop node module 1312 deletes the single-link loop node and the links associated with it and updates the corresponding row and column numbers. The modified adjacency matrix, after node 4 and its links are deleted, is shown in FIG. 18 and the routing pattern for this matrix shown in FIG. 20. This process is repeated until no further single-link loop nodes remain. In the example there are no more single-link loop nodes once node 4 is deleted and hence the process returns to the delete sink module 1310. Since there are no sinks or sources remaining, no additional nodes are deleted by the delete sink and delete source modules 1310 and 1311. The process therefore proceeds to the delete non-loop tandem node module 1313. All the nodes remaining in the routing pattern at this stage of the process are tandem nodes and have incoming and outgoing links. This module identifies tandem nodes not involved in loops and deletes them. This step is computationally more expensive than the others and hence the process returns to the delete sink module via the decision 1314 immediately after detecting the first non-loop tandem node.

There are two steps in identifying non-loop tandem nodes. In step one, a check is made to see if there is any node i which meets the following conditions: (i) $r(i)=1$ or $c(i)=1$, but not both, (ii) $(i,j)=1$ and $(j,i)=1$, where $(i,j)$ and $(j,i)$ are entries of the modified adjacency matrix and (iii) if $r(i)=1$, then there is no return path from node j of length greater than one hop or if $c(i) = 1$, then there is no path to node j of a length greater than one hop. If such a node exists, then that node is essentially like a sink (if $c(i) = 1$) or a source (if $r(i) = 1$) except for the fact that it is involved in a single-link loop with node j. If such a node is found, this module deletes the node and the associated links and returns control to the delete sink module 1310. If such nodes do not exist, then the delete non-loop tandem node module 1313 begins the second step. In this step, a check is made to determine if there is any node i satisfying the following condition: $(i,j) = 1$ and that there is no return path from the node j to node i. If such a node exists, then it is a non-loop tandem node. The module 1313 then deletes this node i and the links associated with it and returns control to the delete sink module 1310.

When step 1 is executed, in this example, it is found that node 3 is essentially a source node except for the fact that it is involved in a single-link loop with node 5. Node 3 and its links are therefore deleted and control returns to the delete sink module 1310. It can be seen from FIG. 20 that once node 3 and its associated links are deleted, node 5 becomes a source. Node 5 is then deleted by the delete source module 1311. Nodes 2 and 6 in succession also appear as source nodes and similarly get deleted by the delete source module 1311. No further node deletion is possible after this and, hence, the process concludes that the remaining nodes, nodes 7, 8 and 9 are involved in one or more loops.

The next step in loop detection is to determine the number and orientation of loops. This step is performed by step 1315. Specifically, the routine is as follows: (i) Of all the nodes involved in loops, find the node with the largest number of incoming and outgoing links. This node is likely to be involved in the most number of loops. Let this node be $n_0$. (ii) If there is a link from $n_0$ to node i (i.e., $(n_0, i) = 1$). Then determine the return paths of lengths greater than one hop from i to $n_0$. This gives all of the loops involving the link $n_0$ to i. Once all the network paths from i to $n_0$ are determined, remove link $n_0$ to i by setting $(n_0, i) = 0$ in the adjacency matrix. (iii) Run the modified adjacency matrix through the loop detection process. If no loops remain, then all loops have been found. If there are loops, repeat steps (i) and (ii) until no loops are found. This gives all the loops in the routing pattern. The orientation of each loop is determined simply by keeping track of the nodes appearing in the return path in step (ii). The computations for the loop paths just described may be achieved by a technique disclosed by E. W. Dijkstra, *A Note on Two Problems in Connection with Graphs*, Numerische Mathematik 1, pages 269–271 (1959).

Once the nodes involved in loops, the number of loops and the direction of each loop are determined, this information is provided to a loop elimination process which determines the best loop elimination strategy. In the example, there is only one loop involving nodes 7, 8 and 9, and the loop orientation is 7 to 8 to 9 to 7.

Figure 21:
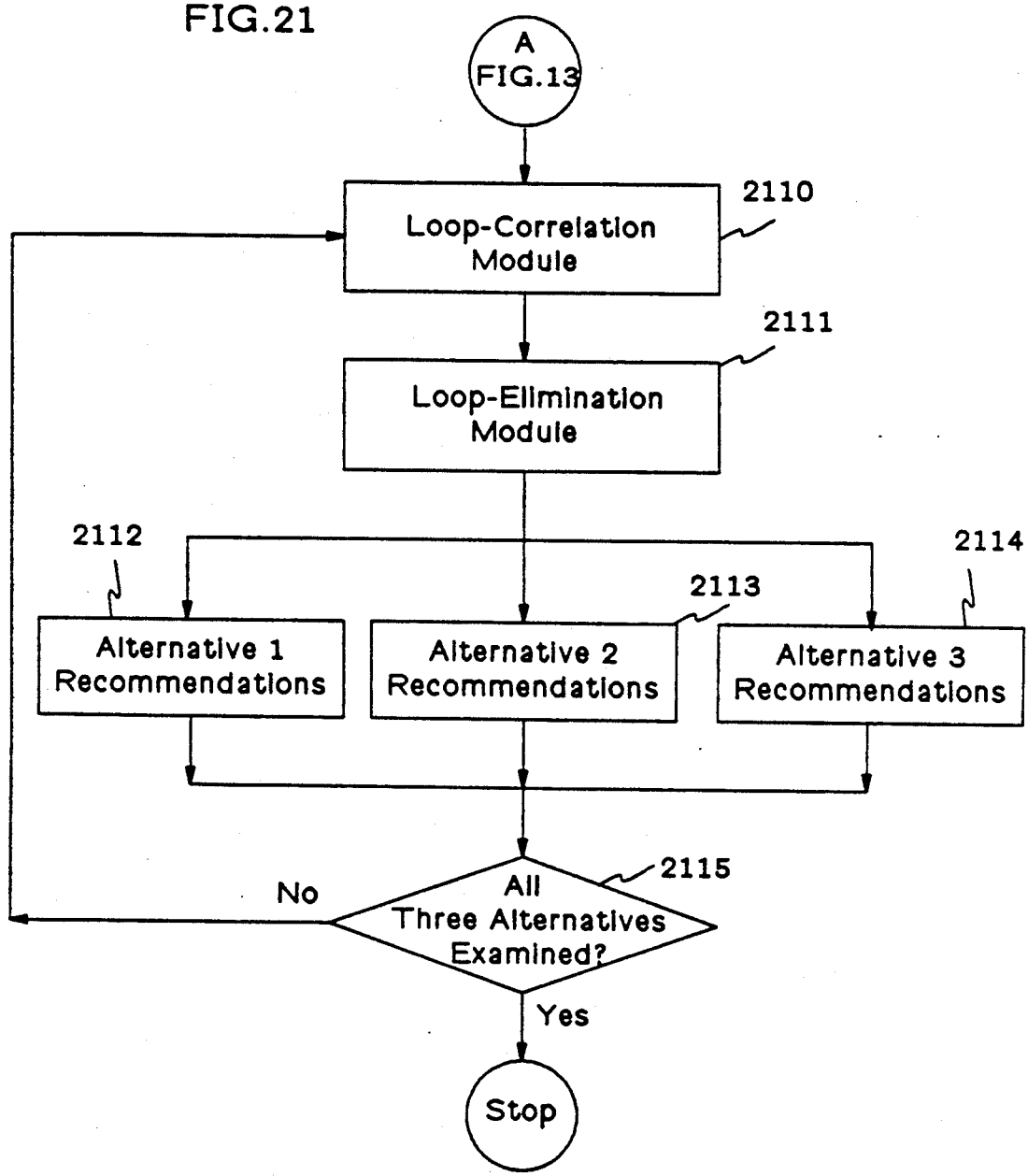
FIG. 21 shows a flow chart outlining a loop elimination process in accordance with the invention.

With reference to FIG. 21, there is shown a flow diagram for the loop elimination process which works with the data provided by the loop detection process and the data contained in the routing matrix R and the network connectivity matrix X. The loop-elimination process consists of two basic modules—the loop-correlation module 2110 and the loop-elimination module 2111. The output of the loop detection process, specifically, the number and orientation of loops, is provided to the loop-correlation module 2110. This module explicitly determines the number of loops each link is involved with through a routine which traverses each loop and updates a counter associated with each link, every time that link is encountered in a loop. The output from this correlation module 2110 therefore is the number of loops associated with each link in the network.

Information from the loop-correlation module 2110 is provided to the loop-elimination module 2111 which begins the loop-elimination process by attempting to break the route involved in the most number of loops. The loop-elimination module examines many different ways of breaking loops. The order in which these different possibilities are examined is prioritized so that expensive changes such as adding new links are near the bottom of the list. This examination priority is as follows:

A. Break the route involved in the highest number of loops if:
 (1) The route corresponds to a routing choice greater than 2;
 (2) The route is a secondary route which can be moved to another link in the routing pattern;
 (3) The route can be moved to any existing link not currently used in the routing pattern.

B. Break any possible route involved in at least one loop in the following order:
 (1) Break any route corresponding to a routing choice greater than 2;
 (2) If two consecutive links in a loop, e.g., i→j and j→k, carry second choice traffic and if there is no return path from j→i of a length greater than one hop, then break route j→k and move it to j→i;
 (3) Break any secondary route which can be moved to another link in the routing pattern;
 (4) Break any route which can be moved to any existing link not currently used in the routing pattern.

C. The next loop breaking option is to add new links. This is done in the following order:
 (1) If j→j is the route involved in the highest number of loops in the routing pattern for destination node k, then add a link from node i to the first node 1 from which node k can be reached and from which no return path to node i of length greater then one hop exists. Break route i→j and create a new route i→l over the new link.
 (2) Select i→j where it is any arbitrary route involved in a loop in the routing pattern for destination node k, then add a link from node i to the first noe 1 from which node k can be reached and from which no return path to node i of length greater than one hop exists. Break route i→j and create a new route i→l over the new link.

D. The last loop breaking option is to reduce the routing choices in the given routing pattern at one or more nodes. Before this option can be accomplished, however, there must be prior knowledge as to which nodes are more expendable than others.

Because of the many different ways of breaking loops, it is not trivial to determine beforehand which solution is best suited for a given network. A reviewer who decides just how the loops should be broken is therefore provided with the option of examining up to three different loop-elimination alternatives. Referring once again to FIG. 21 and the flowchart depicted therein, the loop-elimination module 2111 picks a first solution that breaks all the loops in the given routing pattern. The routing changes necessary to implement this solution are then written at step 2112 into an output file as recommendations under loop-elimination alternative 1. If an examination of the second loop-elimination alternative is desired, then the program returns to the loop-correlation module 2110 and restarts the loop-elimination process. This time the loop-correlation module picks the route involved in the second highest number of loops as a starting point. The loop-elimination module begins the loop-elimination process from this starting point and examines different possibilities for breaking loops until a solution that breaks all the loops is found. This solution is then written at step 2113 into the output file as recommendations under alternative 2.

If an examination of the third alternative is desired, the loop-correlation module 2110 picks the route involved in the third highest number of loops as a starting point and the entire loop-elimination process is repeated. The resulting solution is written at step 2114 into the output file as recommendations under alternative 3. Not always will the three alternatives produce three different solutions. The solutions depend on the network connectivity and the possibilities that exist for breaking the loops. It is quite possible that two, or even all three, of the alternatives may produce the same solution. An examination of all three alternative solutions may be conducted by the reviewer and the solution that best meets the projected needs implemented.

Referring once again to FIGS. 14 and 21 in combination for illustrating, by way of example, the operation of the loop elimination process, the routing pattern in FIG. 14 has been reduced to a single loop, 7 to 8 to 9 to 7, by the loop detecting process. Since there is only one loop present, the loop-correlation module picks the first route in the loop, route 7 to 8 as the starting point and the loop-elimination module 2111 extracts the routing information for nodes 7, 8 and 9 from the routing matrix shown in FIG. 15. The routing submatrix involving nodes 7, 8 and 9 is shown in FIG. 22 and is is simply the information contained in rows 7, 8 and 9, and columns 7, 8 and 9 of the routing matrix shown in FIG. 15.

The loop-elimination module 2111 then begins the loop elimination process and steps through the various loop-breaking possibilities according to the prioritized sequence previously described herein. After examining several loop-breaking possibilities, the loop-elimination module checks to see if there are two consecutive links in the loop which carry alternate routed traffic (that is, second or higher choice traffic). In the example, in the loop 7 to 8 to 9 to 7, links 7 to 8 and 8 to 9 both carry second choice traffic. The loop elimination process next checks to see if there is a return path from node 7 to node 8 containing more than one hop. Since there is not return path from node 7 to node 8 having more than one hop, the loop elimination process recommends that route 8 to 9 be broken and route 8 to 7 be created. This breaks the loop and preserves the same number of routing choices at node 8 as before, without creating a new loop. This solution is written into the output file as recommendations under alternative 1. It is necessary to check for multiple hop return paths from node 7 to node 8 since if such a path exists, then by creating route 8 to 7, a new loop will be created. It is also necessary to identify two consecutive links which are part of the loop and which carry alternately routed traffic. Otherwise, if one of the consecutive links is carrying primary traffic, then a single-link loop of the form

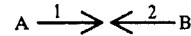

is created which leads to unnecessary call blocking. In such a case, the second choice routed calls from B get blocked at A.

Once the loop elimination procedure is complete, the alternative recommendations acceptable to the reviewer are made in the existing routing matrix R. This involves replacing entries that correspond to broken routes by zeroes, and replacing entries that correspond to new routes by the corresponding routing choices. The new routing matrix created for the network shown in FIG. 14 is shown in FIG. 23. It is seen in this new matrix that the entry corresponding to row 8 and column 9 is 0 (indicating that the route from 8 to 9 is broken), while the entry corresponding to row 8 and column 7 is 2 (indicating that 8 to 7 is a new route). If found acceptable to the reviewer, the recommended changes as provided by the new routing matrix are implemented into the routing pattern of the network.

One of the design objectives in node-by-node switched virtual circuit networks is that there must be at least one path between every pair of nodes that does not contain more than a specified number of hops which is designated as the hop-constraint "H." If the hop-constraint is violated for any pair of nodes, then the calls between those two nodes are being routed circuitously. Since circuitous routing affects network performance, it is important to detect and correct circuitous routing. This is achieved by a process in the circuitous routing detection module. As with call looping, circuitous routing is also destination dependent and hence all routing patterns corresponding to all destinations of interest must be checked for circuitous routing. As in the case of loop detection, the number of routing patterns may be limited by omitting end-points as desired. Further, in case of large networks, the access portion nodes may also be omitted.

Circuitous routing constraints are generally made applicable to primary paths only, since it is very expensive to enforce hop-constraints on alternate paths. The process therefore is intended for detecting circuitous routing in primary paths. Where necessary, however, this same process may also be used with suitable input data to detect circuitous routing in alternate paths. The data needed as input for detecting circuitous routing in primary paths is information regarding the primary routing choices from all the nodes in a routing pattern. This information may be represented in the form of a matrix designated as the primary routing matrix P (not shown). It is obtained from the routing matrix by setting all elements of the routing matrix that are greater than one to zero. The matrix P is thus generated automatically by the process from the routing matrix. Once the hop-constraint H is specified by the user, the process checks the lengths of the primary paths to the destination node, from all the nodes that are not directly connected to the destination node. If any path exceeds the hop-constraint H, then that path is identified as a circuitous route and the user then reviews the routing choices for the network and selects a more direct path that does not violate the hop-constraint. It is possible that in selecting a new path, the reviewer may inadvertently create loops. Each time a circuitous path is replaced by a new path, therefore, the new routing pattern must be checked for loops. If loops are found, then one of the loop breaking alternative recommendations should be implemented. This, in turn, may cause circuitious routing which has to be removed. Thus resolving the circuitious routing problem is an iterative process.

To route a call, as earlier indicated herein, a node must know all the area codes in the network, all the exchanges in its own area, and all the service-names in its own exchange. If any part of this information is not present in the routing tables of one or more nodes, then dead-end routes will result. To check for dead-end routes, the information in each of the routing tables must be compared with the detailed network configuration information available from the network database to make sure that the data needed to route calls to all the desired destinations is present in all the routing tables. This comparison is achieved by the execution of a process contained in the dead-end route detection module. If any information is detected as missing, it is added to the appropriate routing tables.

Various other modifications of this invention are contemplated and may obviously be resorted to by those skilled in the art without departing from the spirit and scope of the invention as hereinafter defined by the appended claims.

I claim:

1. Apparatus for detecting call looping in a node-by-node data routing network including a plurality of nodes for routing data calls, each node having routing information for directing data calls over multiple paths to multiple destinations, said apparatus comprising:
    means for identifying those nodes in the network that are involved in call looping for data calls directed to specific destinations; and
    means for modifying the routing information in at least one node involved in the call looping, the modifying means altering a routing path for a data call to a specific destination in a manner that prevents the data call from looping among the identified nodes.

2. The apparatus for detecting call looping as in claim 1 wherein the identifying means further comprises means for identifying those nodes in the network that are configured in a manner such that they are potentially involved in call looping and identifying those nodes in the network that are configured in a manner such that they are not involved in call looping.

3. The apparatus for detecting call looping as in claim 2 wherein those nodes that are potentially involved in call looping comprise nodes configured as tandem nodes.

4. The apparatus for detecting call looping as in claim 2 wherein the identifying means further comprises means for determining a number of call loops in the routing network and the direction of travel between nodes for each loop.

5. The apparatus for detecting call looping as in claim 4 further comprising means for detecting circuitous routing, the circuitous routing detecting means providing an indication when the number of nodes provided in a routing pattern for a primary path to the specific destination exceeds a predetermined number.

6. The apparatus for detecting call looping as in claim 5 further comprising means for detecting dead-end routing, the dead-end routing detecting means providing a means for comparing information in routing tables in the nodes of the network with that in a network database and providing an indication if any information is detected as missing from the routing tables.

7. A method of detecting call looping in a node-by-node data routing network including a plurality of nodes for routing data calls, each node having routing information for directing data calls over multiple paths to multiple destinations, the method comprising the steps of:
    identifying those nodes in the network that are involved in call looping for data calls directed to specific destinations; and
    modifying the routing information in at least one node involved in the call looping, the modifying step altering a routing path for a data call to a specific destination in a manner that prevents the data call from looping among the identified nodes.

8. The method of detecting call looping in a node-by-node data routing network as in claim 7 wherein the identifying step further comprises the steps of identifying those nodes in the network that are configured in a manner such that they are potentially involved in call looping and identifying those nodes in the network that are configured in a manner such that they cannot be involved in call looping.

9. The method of detecting call looping in a node-by-node data routing network as in claim 8 wherein those nodes that are potentially involved in call looping comprise nodes configured as tandem nodes.

10. The method of detecting call looping in a node-by-node data routing network as in claim 8 further comprising the step of determining a number of call loops in the network and the direction of travel between nodes for each loop.

11. The method of detecting call looping in a node-by-node data routing network as in claim 10 wherein the information modifying step further comprises the steps of: determining the routing paths that are involved in the highest number of loops in a routing pattern for the data call to the specific destination, examining a series of alternative recommendations for breaking the loops in the routing pattern, and providing one of the series of alternative recommendations to the network for modifying the routing information.

12. The method of detecting call looping in a node-by-node data routing network as in claim 7 wherein the identifying step further comprises the step of generating a routing matrix for each destination from the routing information contained in each node, the routing matrix containing data reflective of a circuit connection between individual nodes and priority of a routing choice for routing calls to the specific destination over the circuit connection.

13. The method of detecting call looping in a node-by-node data routing network as in claim 12 wherein the identifying step further comprises the step of generating an adjacency matrix for each destination from the routing matrix, the adjacency matrix containing data reflective only of the circuit connection between individual nodes for routing calls to the specific destination.

14. The method of detecting call looping in a node-by-node data routing network as in claim 13 further comprising the steps of identifying those nodes in the network that are configured in a manner such that they are potentially involved in call looping and identifying those nodes in the network that are configured in a manner such that they are not involved in call looping, the adjacency matrix providing the routing information for determining these identifying steps.

15. The method of detecting call looping in a node-by-node data routing network as in claim 14 further comprising the step of determining a number of call loops and the direction of travel between nodes for each loop.

16. The method of detecting call looping in a node-by-node data routing network as in claim 15 wherein the information modifying step further comprises the step of generating a connectivity matrix for the network, the connectivity matrix containing data reflective only of a circuit connection between individual nodes in the routing network.

17. The method of detecting call looping in a node-by-node data routing network as in claim 16 wherein the information modifying step further includes the steps of: determining the number of loops associated with each circuit connection, examining a series of alternative recommendations for breaking the loops in a routing pattern for the data call to the specific destination, and providing one of the series of alternative recommendations to the network for modifying the routing information.

18. The method of detecting call looping in a node-by-node data routing network as in claim 17 wherein a first alternative recommendation concerns breaking the circuit connection involved in the highest number of loops in the routing pattern, and a second alternative recommendation concerns breaking the circuit connection involved in the second highest number of loops in the routing pattern.

19. Apparatus for detecting call looping in a node-by-node data routing network including a plurality of nodes for routing data calls, each node having routing information for directing data calls over multiple paths to multiple destinations, said apparatus comprising:

means for identifying those nodes in the network that are potentially involved in call looping for data calls directed to specific destinations; and means for modifying the routing information in at least one node involved in the call looping, the modifying means altering a routing path for a data call to a specific destination in a manner that prevents the data call from looping among the identified nodes.

20. The apparatus for detecting call looping as in claim 19 wherein the identifying means further comprises means for identifying those nodes in the network that are configured in a manner such that they are potentially involved in call looping and identifying those nodes in the network that are configured in a manner such that they are not involved in call looping.

21. The apparatus for detecting call looping as in claim 20 wherein those nodes that are potentially involved in call looping comprise nodes configured as tandem nodes.

22. The apparatus for detecting call looping as in claim 20 wherein the identifying means further comprises means for determining a number of call loops in the routing network and the direction of travel between nodes for each loop.

* * * * *